Nov. 16, 1948.                 W. A. BRECHT                 2,454,131
                              LOCOMOTIVE DRIVE
Original Filed Aug. 26, 1943                          2 Sheets-Sheet 1
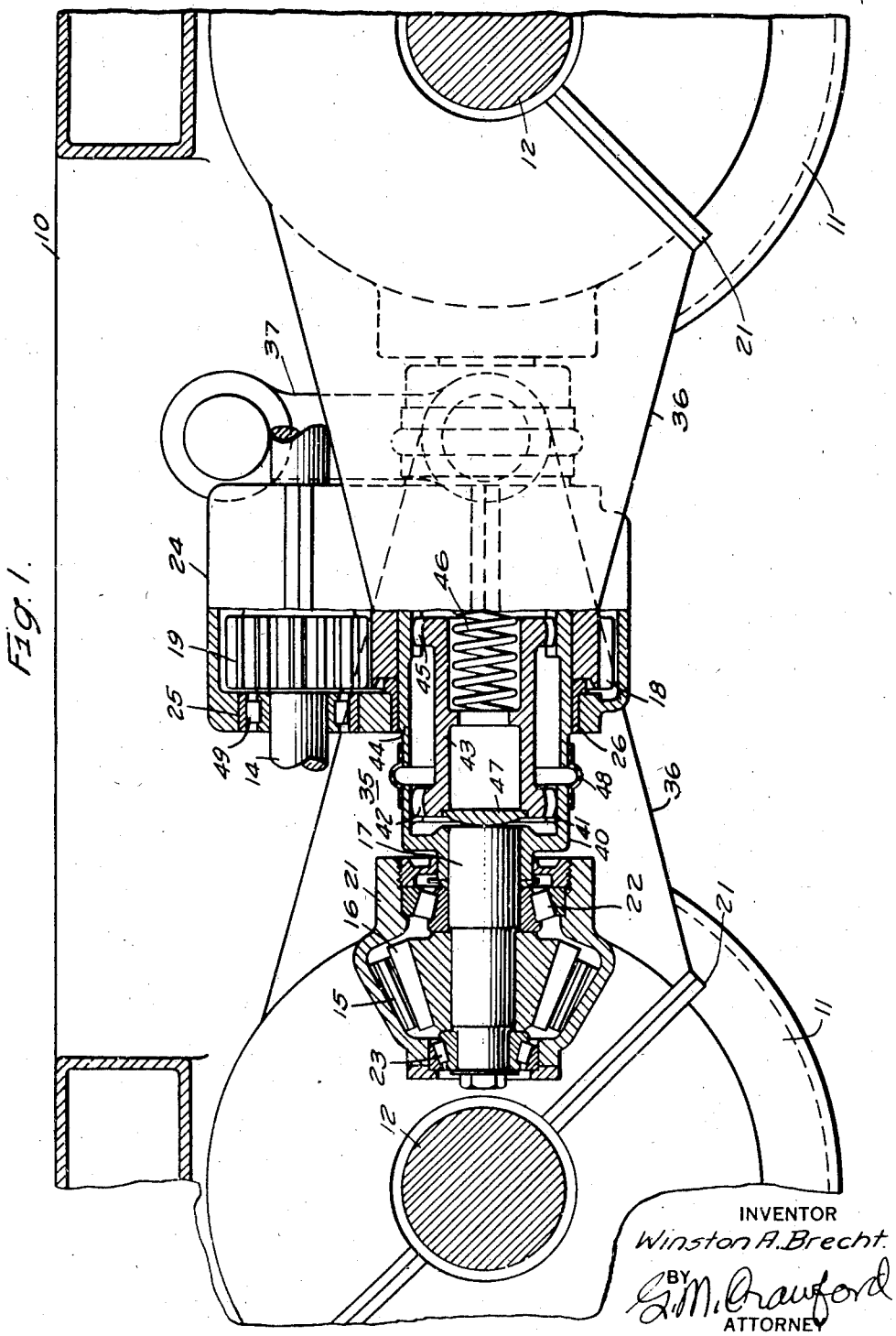
INVENTOR
Winston A. Brecht.
BY
ATTORNEY

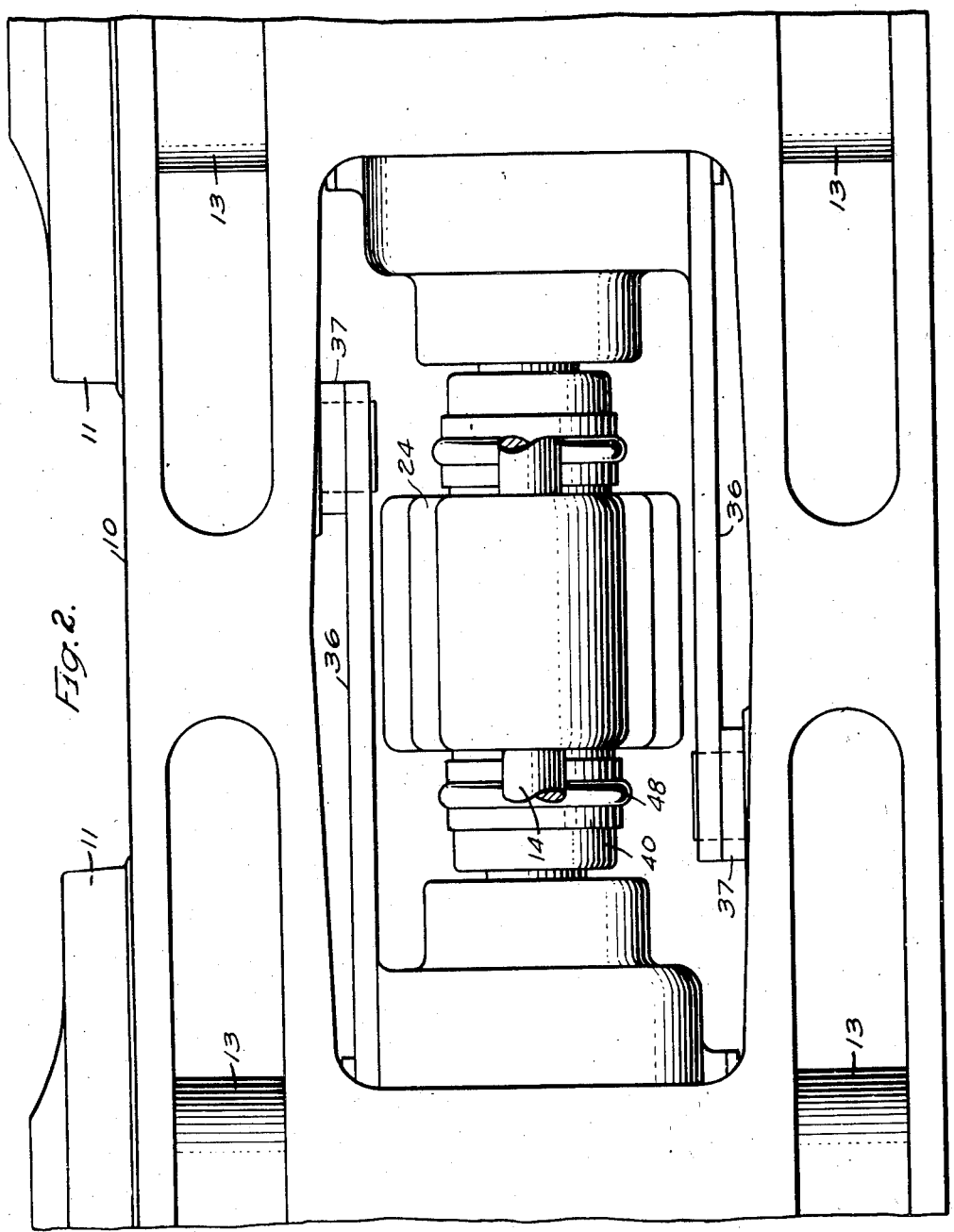

Patented Nov. 16, 1948

2,454,131

UNITED STATES PATENT OFFICE 2,454,131

LOCOMOTIVE DRIVE

Winston A. Brecht, Pittsburgh, Pa., assignor to Westinghouse Electric Corporation, East Pittsburgh, Pa., a corporation of Pennsylvania Original application August 26, 1943, Serial No. 500,096, now Patent No. 2,411,363, dated November 19, 1946. Divided and this application October 12, 1945, Serial No. 622,052

5 Claims. (Cl. 105—117)

This application is a division of my copending application, Serial No. 500,096, filed August 26, 1943, which has since matured into U. S. Patent No. 2,411,363, granted November 19, 1946.

My invention relates, generally, to locomotive drives and, more particularly, to drives for steam turbine locomotives. However, it is not limited to that application and may be utilized with any prime mover where it is desirable to drive one or more axles from a single prime mover.

Heretofore, in locomotive drives it has been thought necessary to utilize quills, one of which surrounds each driving axle, and to transmit torque from the quills to the driving wheels by means of flexible drives. With a drive of the foregoing type it might be necessary to connect the wheels of adjacent axles by means of side rods to enforce a division of the power flow to each axle when the wheel diameters are not exactly equal.

An object of my invention, generally stated, is to provide a locomotive drive which shall be simple and efficient in operation and which may be economically manufactured and installed.

A more specific object of my invention is to provide a locomotive drive which shall ensure an equal division of load between the driving wheels.

Another object of my invention is to permit angular misalignments between the axes of certain of the shafts of a gear drive.

A further object of my invention is to permit both vertical and lateral movement of a gear driven axle relative to the driving unit.

Still another object of my invention is to provide a locomotive drive which can be utilized in a locomotive having its main frame mounted inside the wheels.

A still further object of my invention is to provide a locomotive drive suitable for a locomotive having one or more driving axles.

Other objects of my invention will be explained fully hereinafter or will be apparent to those skilled in the art.

In accordance with one embodiment of my invention, a bevel gear is disposed on each one of a pair of adjacent axles. The bevel gears are driven by pinions on shafts movably connected to an intermediate gear unit disposed between the axles. The intermediate gear unit is connected to the prime mover, such as a steam turbine, by a shaft extending longitudinally of the locomotive.

For a fuller understanding of the nature and objects of my invention, reference may be had to the following detailed description, taken in conjunction with the accompanying drawings, in which:

Figure 1 is a view, partially in section and partially in elevation, of a locomotive drive embodying my invention;

Fig. 2 is a view, partially in plan and partially in section, of the structure shown in Fig. 1.

Referring to the drawings, and particularly to Fig. 2, the portion of a locomotive structure shown therein comprises a pair of side frame members 10 which are disposed inside of the flanges of driving wheels 11 mounted on a pair of adjacent axles 12. The frame members 10 may be mounted on the axles 12 by means of journal bearings 13 of the usual type.

As shown in Fig. 1, the adjacent axles 12 may be driven by a main drive shaft 14 which extends longitudinally of the locomotive and may be connected to a steam turbine or other suitable prime mover in any suitable manner such as that disclosed in the copending application of W. A. Brecht and F. L. Alben, Serial No. 500,097, filed August 26, 1943, now Patent No. 2,394,037.

In order to transmit torque from the main drive shaft 14 to the axles 12, a bevel gear 15 is mounted on each axle and is driven by a pinion 16 which is secured to an auxiliary drive shaft 17 disposed substantially parallel to the main drive shaft 14. The auxiliary drive shafts 17 are both movably connected to an intermediate gear 18 which is driven by pinions 19 secured to the main drive shaft 14. A split gear case 21 surrounds the bevel gear 15 upon each axle and contains roller bearings 22 and 23 for supporting the auxiliary shaft 17, thereby maintaining the pinion 16 in accurate alignment with its bevel gear 15 at all times.

The intermediate gear 18 and the pinions 19 are supported by a gear case 24 which may be split along the planes through the centers of the axles 12 and the drive shaft 14. The gear case 24 may be mounted in the locomotive frame in the manner disclosed in the aforesaid copending application. Suitable bearings 25 are provided in the gear case 24 for the main drive shaft 14. Likewise, sleeve bearings 26 may be provided in the gear case 24 for the intermediate gear 18.

In the embodiment of the invention shown in Figs. 1 and 2, a coupling structure is utilized to provide for relative motion between the axle gear unit and the intermediate gear unit. In the structure shown in Figs. 1 and 2, each one of the auxiliary shafts 17 is connected to the intermediate gear 18 by means of a double-coupling unit 35.

Each gear case 21 is also provided with an extension 36 which is a torque arm for the axle gear unit. Each torque arm 36 may be movably connected to the locomotive frame by means of a link 37. In this manner a certain degree of lateral freedom of motion for the axle assembly with respect to the intermediate gear unit is permitted by the present structure. In addition, this freedom of movement permits the elimination of splines on the locomotive axles 12.

The double-coupling shown in Fig. 1 comprises a member 40 secured to the shaft 17 and having internal teeth 41 which mesh with external teeth 42 provided on a coupling member 43. The member 43 is disposed inside of an internal gear 44 which, in turn, is disposed inside of the intermediate gear 18. The coupling member 43 is provided with external teeth 45 which mesh with the internal gear 44. Thus, torque is transmitted from the gear 18 through the internal gear 44, the coupling members 43 and 41, the shaft 17 and the bevel gears 16 and 15, to the axle 12.

Similar coupling members 40 and 43 are provided for the shaft 17 which drives the other axle 12. A coil spring 46 may be disposed between the two coupling members 43, thereby maintaining them in spaced relation. A bearing plate 47 may be provided in the outer end of each coupling member 43 for engagement with the ends of the shafts 17. A flexible covering 48 may be provided for the space between the coupling member 40 and the internal gear 44, thereby protecting the coupling members. If desired, the bearing 25 provided in the gear case 24 for the shaft 14 may be of a type having rollers 49.

With the drive herein described, the two axles 12 are so tied together through the bevel gears 15 and 16, the shafts 17, the flexible couplings and the intermediate gear unit 18 that both axles must rotate at the same speed, as in the case of a side rod drive. However, the unbalance resulting from the use of side rods is eliminated. Furthermore, the axle drive is greatly simplified by the elimination of the quills and the cup or other flexible drives previously utilized.

As explained hereinbefore, the present drive makes it possible to utilize main truck frame members which are disposed between the wheel flanges. The foregoing features materially reduce the weight of the locomotive structure, which is of great importance in the design of a high-powered steam locomotive. Furthermore, the simplification and reduction of the number of wearing parts utilized in the driving mechanism will reduce operating and maintenance expense.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive drive, in combination, a pair of axles having wheels thereon, frame members disposed between said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, coupling means slidably disposed in the intermediate gear for flexibly connecting each auxiliary shaft to the intermediate gear, spring means disposed between said coupling means, a gear case for enclosing each one of the axle gears, a torque arm for each gear case, and means for movably connecting the torque arms to the frame members on opposite sides of the intermediate gear.

2. In a locomotive drive, in combination, a pair of axles having wheels thereon, frame members disposed between said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, coupling means slidably disposed in the intermediate gear for flexibly connecting each auxiliary shaft to the intermediate gear, spring means disposed between said coupling means, a gear case for enclosing each one of the axle gears, a torque arm for each gear case, and means for movably connecting the torque arms to the frame members on opposite sides of the intermediate gear, said torque arms being of sufficient length to extend past said intermediate gear.

3. In a locomotive drive, in combination, a pair of axles having wheels thereon, frame members disposed between said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, coupling means slidably disposed in the intermediate gear for flexibly connecting each auxiliary shaft to the intermediate gear, spring means disposed between said coupling means, a gear case for enclosing each one of the axle gears, a torque arm for each gear case, said torque arms being formed integrally with the gear cases, and means for movably connecting the torque arms to the frame members.

4. In a locomotive drive, in combination, a pair of axles having wheels thereon, frame members disposed between said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, coupling means having one end slidably disposed inside of the intermediate gear for flexibly connecting each auxiliary shaft to the intermediate gear independently of the other auxiliary shaft, a gear case for enclosing each one of the axle gears, a torque arm for each gear case, and means for movably connecting the torque arms to the frame members.

5. In a locomotive drive, in combination, a pair of axles having wheels thereon, frame members disposed between said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, coupling means having one end slidably disposed inside of the intermediate gear for flexibly connecting each auxiliary shaft to the intermediate gear independently of the other auxiliary shaft, a gear case for enclosing each one of the axle gears, a torque arm for each gear case, and swing links for movably connecting the torque arms to the frame members on opposite sides of the intermediate gear.

WINSTON A. BRECHT.

REFERENCES CITED

The following references are of record in the file of this patent:

UNITED STATES PATENTS

| Number | Name | Date |
| --- | --- | --- |
| 1,222,610 | Dunkley | Apr. 17, 1917 |
| 1,411,363 | Lieberman | Apr. 4, 1922 |
| 1,665,865 | Templin | Apr. 10, 1928 |
| 1,776,479 | Rayburn | Sept. 23, 1930 |
| 1,867,678 | Rayburn | July 19, 1932 |
| 2,051,073 | Burrows et al. | Aug. 18, 1936 |

FOREIGN PATENTS

| Number | Country | Date |
| --- | --- | --- |
| 37,886 | Holland | Apr. 15, 1936 |